(No Model.)
L. BECKER & A. E. SEINECKE.
Maltster's Plow.
No. 243,098.      Patented June 21, 1881.
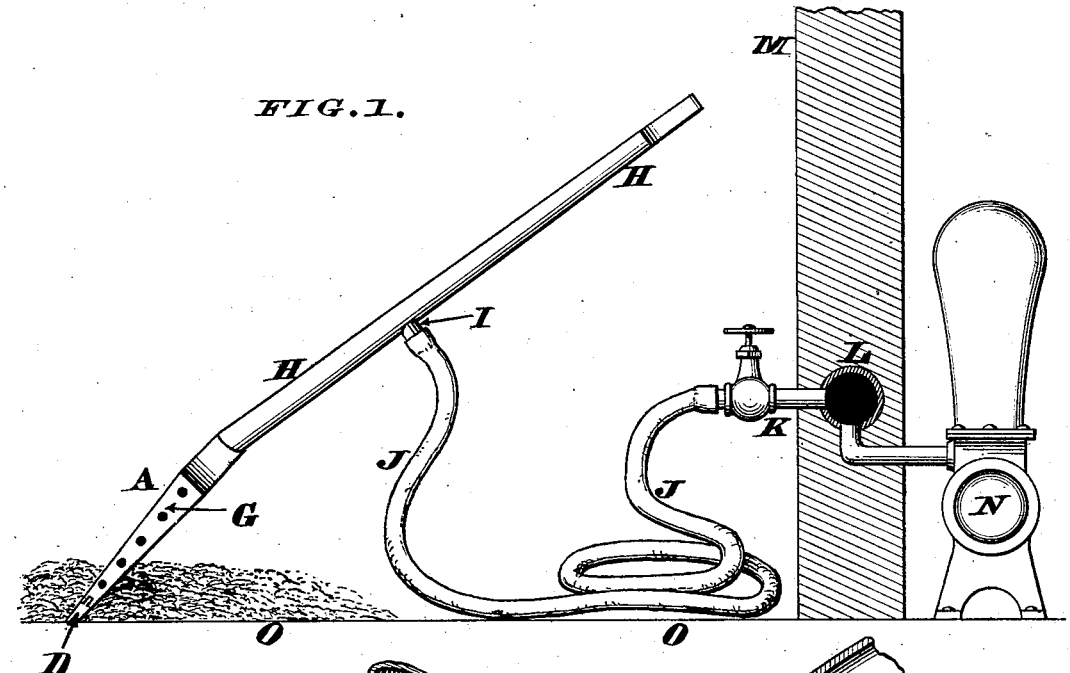
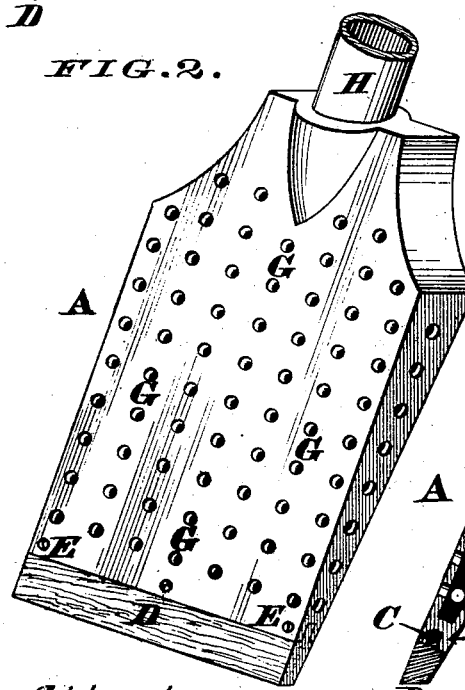
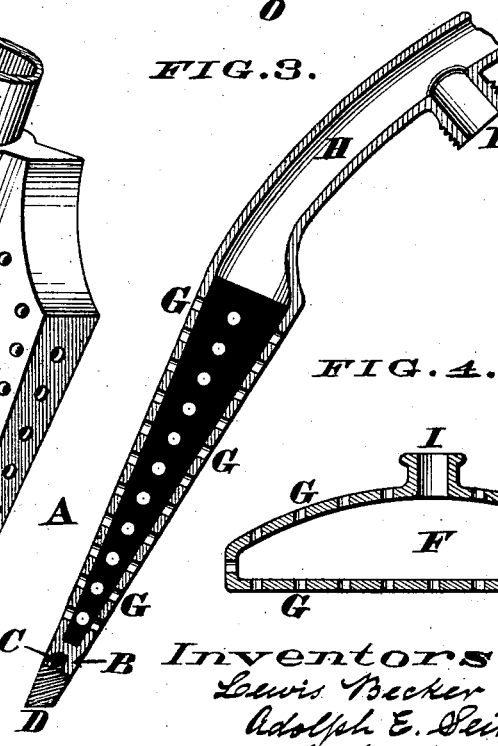
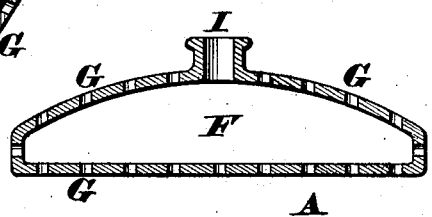

UNITED STATES PATENT OFFICE.

LEWIS BECKER AND ADOLPH E. SEINECKE, OF CINCINNATI, OHIO.

MALTSTER'S PLOW.

SPECIFICATION forming part of Letters Patent No. 243,098, dated June 21, 1881.

Application filed February 7, 1881. (No model.)

*To all whom it may concern:*

Be it known that we, LEWIS BECKER and ADOLPH E. SEINECKE, both of Cincinnati, Hamilton county, Ohio, have invented a new and useful Maltster's Plow, of which the following is a specification.

The object of our invention is to furnish an apparatus that will supersede the heavy, complicated, and expensive mechanical appliances heretofore employed for turning and spreading grain while undergoing the process commonly known by maltsters as "flooring."

Our improvement comprises a light hollow or chambered plow, capable of being readily managed by hand, said plow having an extended surface pierced with numerous slots or other suitable apertures, to permit a free discharge of air or vapor therefrom. The air, which may be either warm or cold, is conducted into the chambered plow with a hose, or any other flexible tube that will allow the implement to be manipulated with perfect facility, sufficient pressure being given to the air by means of a compressor of any approved form, as hereinafter more fully described.

In the annexed drawings, Figure 1 represents the preferred arrangement of our plow with its hose attachment and air-compressor. Fig. 2 is a perspective view of the plow proper. Fig. 3 is an enlarged vertical section of the same, taken in the plane of the tubular handle. Fig. 4 is a horizontal section of the plow.

The plow proper consists of a shovel-shaped device, A, of any desired size and material, and having at its lower edge a groove or socket, B, to receive a tongue, C, of the detachable wooden shoe D. E are screws which pass through this tongue C and thereby unite said shoe to the plow. Furthermore, this plow is furnished with one or more chambers, F, and a series of slots or apertures, G, which perforations should not be so large as to allow grain to enter said chamber. These apertures should be quite numerous, and it is preferred to make them in the front, back, sides, and top edges of the plow.

Communicating with the chamber or chambers F of the plow is a tubular handle, H, of such a length as to enable the maltster to manage the implement with the utmost facility. This handle has a short neck or coupling, I, for attachment of one end of a hose or other flexible tubing, J, the other end of said hose being fastened to a valved branch pipe, K, communicating with a main, L, that may be built into or alongside one of the walls, M, of the malthouse.

N is a pump or other device for producing within the main L the desired pressure of air.

O is the floor upon which the grain is spread.

Our improved plow is used as follows: The grain, after having been steeped and couched in any approved way, is then spread upon the floor O, and as soon as it becomes necessary to turn the malt the pump N is started, so as to produce any desired pressure of air in the main L—say about five pounds to the square inch. The hose J being now coupled to the branch pipe K and the valve of the latter opened, the maltster then proceeds to turn and spread the grain in the usual way, and while this operation is being accomplished it is evident a minute but powerful jet of air is being discharged through each of the perforations G, which air is thus caused to permeate the malt in the most thorough manner. As a result of this thorough diffusion of air through the grain, the operator has complete control of the malt, and can regulate its temperature with the utmost nicety, and without being compelled to depend on the state of the weather. If the grain is drying too rapidly, the pump N can be supplied with a limited quantity of water, so as to slightly moisten the air issuing from the hollow plow; but if the grain is not drying quick enough, the pump may force a blast of warm air through the plow, while any heating of the malt may be prevented by simply driving cold air through the implement.

It will thus be seen that the simple provision of our hollow perforated plow and its hose attachment enables the maltster to handle the grain as readily as with an ordinary plow, and by having a series of branches, K, a large floor of malt can be " thrown" as readily as a small one. As this room of a malt-house is usually made of cement, it is evident the lower edge of the plow would soon be ground off by contact therewith; but by furnishing the implement with a wooden shoe, D, this difficulty is obviated, as a worn shoe can be detached and a new one substituted therefor in a few minutes.

The invention may be modified by attaching two or more implements to a single handle, and, if preferred, the hose-coupling I may project from the back of the plow, as seen in Fig. 4. Finally, the plow may be made of a light frame, of wood or iron covered with wire-cloth.

We are aware it is not new to employ heavy, complicated, and expensive mechanical appliances driven by power for flooring grain and causing air to permeate the same. Therefore our claims are not to be construed as an attempt to cover any and every device that can be used for such a purpose, but are limited to the hollow plow having an extended perforated surface, and a hose or flexible connection communicating with a suitable compressor, whereby this process of flooring grain can be readily accomplished by hand, thus adapting our apparatus to small breweries, where power is not always obtainable.

We claim as our invention—

1. The combination of a hollow hand-plow having an extended perforated surface that turns or floors the grain and allows the free passage of air through the same, a device for producing the desired pressure of air, and a flexible coupling or hose connecting said hand-plow and compressor, as herein described.

2. The combination of hollow perforated hand-plow A F G, tubular handle H, and flexible connection or hose J, said hand-plow having an extended surface for turning or flooring the grain, as herein described.

3. The combination of hollow perforated hand-plow A F G, tubular handle H I, hose or flexible connection J, valved pipe K, and compressor N, said hand-plow having an extended surface for turning or flooring the grain, as herein described.

In testimony of which invention we hereunto set our hands.

LEWIS BECKER.
ADOLPH E. SEINECKE.

Witnesses:
JAMES H. LAYMAN,
RANKIN D. JONES.